United States Patent [19]
Decool

[11] Patent Number: 5,619,803
[45] Date of Patent: Apr. 15, 1997

[54] PNEUMATIC MEASUREMENT PLUG

[75] Inventor: François Decool, Bayeux, France

[73] Assignee: Societe Industrielle de Liaisons Electriques, Paris Cedex, France

[21] Appl. No.: 555,150

[22] Filed: Nov. 8, 1995

[30] Foreign Application Priority Data

Nov. 10, 1994 [FR] France .................. 94 13555

[51] Int. Cl.$^6$ .................. G01B 13/10
[52] U.S. Cl. .................. 33/543.1; 33/DIG. 2
[58] Field of Search .................. 33/542.1, 785, 33/542, 543.1, 544, 544.5, 544.6, 555.1, DIG. 2

[56] References Cited

U.S. PATENT DOCUMENTS

| | | | |
|---|---|---|---|
| 2,801,475 | 8/1957 | Meyer, Jr. | 33/543.1 |
| 3,037,373 | 6/1962 | Herzberg | 33/543.1 |
| 3,154,939 | 11/1964 | Dabanian et al. | 33/543.1 |
| 3,646,685 | 3/1972 | Goodenough | 33/543.1 |
| 3,858,327 | 1/1975 | Radev et al. | 33/DIG. 2 |
| 4,852,262 | 8/1989 | Babcock et al. | 33/544 |
| 4,872,269 | 10/1989 | Sattmann | |

FOREIGN PATENT DOCUMENTS

| | | |
|---|---|---|
| 0140780 | 10/1984 | European Pat. Off. . |
| 0292767 | 5/1988 | European Pat. Off. . |
| 2015015 | 3/1970 | Germany . |
| 3207837 | 3/1982 | Germany . |
| 4031490 | 10/1990 | Germany . |
| 176607 | 7/1991 | Japan .................. 33/543.1 |
| 698439 | 10/1953 | United Kingdom .................. 33/542 |

OTHER PUBLICATIONS

Russian Engineering Research, vol. 13, No. 9, 1993 N.Y., USA, pp. 62–64, XP 000458450 M.I. Etingof 'errors in measuring hole diameters with an automatically–centered three–contact inside caliper' *p. 63* No Month.

Primary Examiner—Thomas B. Will
Attorney, Agent, or Firm—Griffin, Butler Whisenhunt & Kurtossy

[57] ABSTRACT

The plug comprises an elongate member and at least one measurement ring mounted with radial play on the elongate member and comprising at least one pair of diametrically opposite measurement nozzles fed with gas under pressure, and also at least three centering nozzles disposed around the periphery of the measurement ring on radii that define equal angles between one another, the centering nozzles being fed with gas under pressure independently from the measurement nozzles.

4 Claims, 2 Drawing Sheets

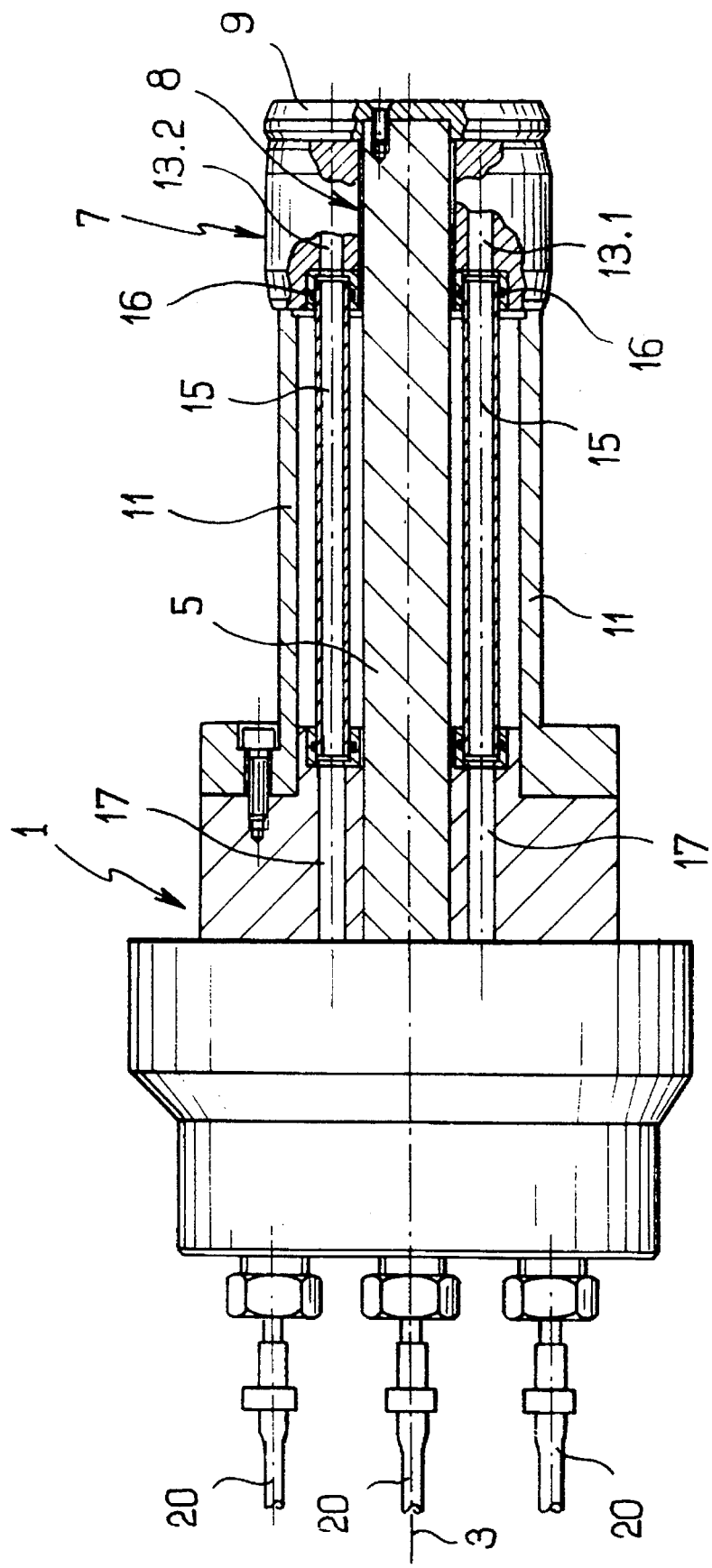
FIG_1

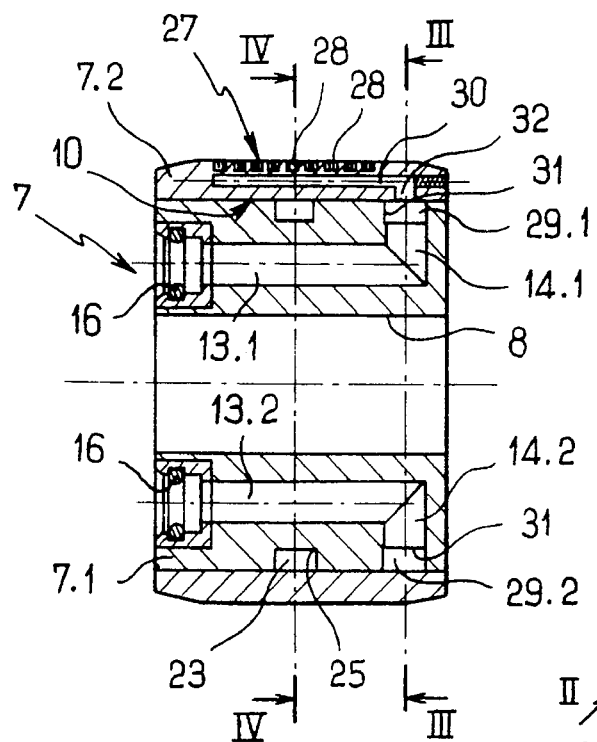
FIG_2
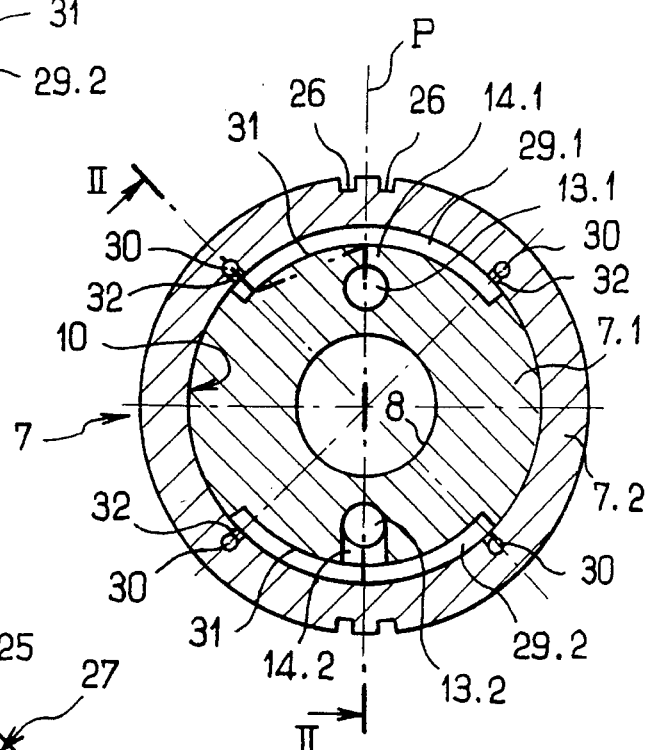
FIG_3
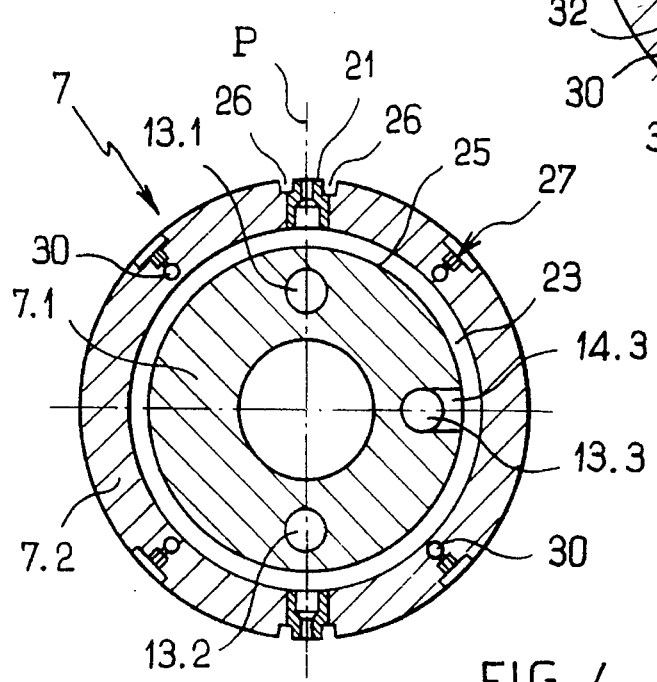
FIG_4

PNEUMATIC MEASUREMENT PLUG

The present invention relates to a pneumatic measurement plug.

BACKGROUND OF THE INVENTION

Pneumatic measurement devices are known that make use of a pressure measurement to determine the distance between a measurement nozzle of the device and a facing wall, which distance is itself representative of the size of the part to be inspected. In the most usual case, a pneumatic measurement device comprises a measurement chamber fed with gas under pressure, a measurement nozzle fed from the measurement chamber, and a pressure take-off disposed in the measurement chamber upstream from the nozzle. The pressure take-off is connected to a pressure gauge, thereby measuring the pressure in the measurement chamber, which pressure is a function of the leakage section between the nozzle and the wall of the part to be inspected, and thus of the distance between the wall and the nozzle.

More specifically, to measure the diameter of a bore of a part to be inspected, pneumatic measurement devices are known that are implemented in the form of plugs. Such pneumatic measurement plugs generally comprise an elongate cylindrical member having a pair of diametrically opposite measurement nozzles fed with gas under pressure via a measurement chamber that is fitted as before with a pressure take-off connected to a pressure gauge. The pressure measured by the gauge is a function of the distances between the wall of the bore and each of the nozzles. Since the distance between the ends of the nozzles is known, the measured diameter of the bore to be inspected can be deduced therefrom.

However, in practice, it is very difficult to cause the axis of the elongate member to coincide with the axis of the bore to be inspected, so the two measurement nozzles are generally situated at different distances from the wall of the bore. Unfortunately, the mathematical relationship relating the distance between the measurement nozzle and the wall with the pressure in the measurement chamber is not linear, such that the measured diameter of the bore varies depending on the position of the plug within the bore, and this gives rise to uncertainty on the real size of the bore. Furthermore, in order to enable the plug to be inserted inside the bore without rubbing against the wall of the bore even in the event of the axis of the measurement plug being offset relative to the axis of the bore, it is necessary to provide for the diameter of the measurement plug to be considerably smaller than the diameter of the bore to be measured, and that causes the distance between the measurement nozzles and the facing wall to be increased. Unfortunately, it is known that the accuracy with which measurement is performed decreases with increasing distance between the nozzle and the wall.

In order to remedy that drawback, pneumatic measurement plugs have been made in which the measurement nozzles are carried by a measurement ring that is itself mounted with radial play relative to the elongate member. This disposition makes it possible for the ring to be centered automatically in the bore even when the elongate member is offset relative to the axis of the bore, and thus to make rings that are very close in diameter to the diameter of the bore. However, the ring can be displaced radially on being inserted into the inside of the bore solely by said ring coming into contact with the bore. The end result is that the measurement ring is disposed off-center by the maximum possible amount within the bore and that tends to degrade measurement, in the manner explained above.

OBJECTS AND SUMMARY OF THE INVENTION

The main object of the invention is to design a pneumatic measurement plug of the above-specified type that makes it possible to improve the measurement of the bore to be inspected.

In order to achieve this aim, the invention provides a pneumatic measurement plug comprising an elongate member and at least one measurement ring mounted with radial play on the elongate member and including at least one pair of diametrically opposite measurement nozzles that are fed with gas under pressure, in which the measurement ring includes at least three centering members disposed around the periphery of the measurement ring on radii that define substantially equal angles between one another, said centering nozzles being fed with gas under pressure independently from the measurement nozzles.

Thus, when the plug is inserted into the bore to be inspected, the gas ejected by the centering nozzles forms a cushion of air between the measurement nozzles and the bore, thereby automatically centering the ring relative to the bore.

According to an advantageous characteristic of the invention, there are four centering nozzles for each measuring ring, the centering nozzles being fed in pairs, with each pair being fed by a feed chamber that is symmetrical in configuration about a plane of symmetry of the centering nozzles. Thus, the gas feed pressure for each centering nozzle is identical, thereby making it possible to obtain an air cushion of uniform pressure for optimum centering of the measurement ring in the bore.

In an advantageous embodiment, the elongate member is a cylinder, the measurement ring has a cylindrical central portion through which the cylindrical elongate member passes, and an annular portion having an inside face mounted in airtight manner on the periphery of the cylindrical central portion, and each feed chamber is defined both by a groove formed in the periphery of the cylindrical central portion and by the inside face of the annular portion.

According to another advantageous characteristic of the invention, each centering nozzle has a plurality of orifices aligned in an axial direction of the measurement ring.

BRIEF DESCRIPTION OF THE DRAWINGS

Other characteristics and advantages of the invention appear on reading the following description of a particular non-limiting embodiment given with reference to the accompanying figures, in which:

FIG. 1 is an elevation view partially in section on an axial plane of a pneumatic measurement plug of the invention;

FIG. 2 is a detail section view on line II—II of FIG. 3, showing the measurement ring of the FIG. 1 device;

FIG. 3 is a view on line III—III of FIG. 2; and

FIG. 4 is a view on line IV—IV of FIG. 2.

MORE DETAILED DESCRIPTION

With reference to FIG. 1, the pneumatic measurement plug comprises a main body 1 on which there is fixed a cylindrical elongate member 5 having an axis of revolution 3. A measurement ring 7 is mounted on the end portion of the cylindrical member 5. The inside diameter of the measurement ring 7 is slightly greater than the outside diameter of the member 5 so that radial play exists between the ring and the member. The ring 7 is also held axially between a plate 9 fixed to the end of the member 5 perpendicularly to the axis 3, and a tubular spacer 11 rigidly fixed to the main body 1 and cantilevered out therefrom to the ring 7.

The measurement ring 7 has three channels 13.1, 13.2, and 13.3, of which only the first two can be seen in FIG. 1. Each of the channels 13.1, 13.2, 13.3 is connected in airtight manner to a tube 15 which extends parallel to the axis 3 to the main body 1 in which three ducts 17 are provided that are individually connected in airtight manner to the three tubes 15 and extend in line therewith. The ducts 17 are connected to pipes 20 associated with sources of gas under pressure (not shown).

FIGS. 2 to 4 show the measurement ring 7 in greater detail. The measurement ring comprises a cylindrical central portion 7.1 in which an axial bore 8 is formed. The diameter of the bore is slightly greater than the outside diameter of the cylindrical member 5 so as to enable the ring 7 to move relative to the cylindrical member 5. In order to prevent such movement being impeded by the stiffness of the tubes 15, resilient O-rings 16 are provided between the ends of the tubes 15 and the corresponding ends of the channels 13. An annular portion 7.2 coaxial with the central portion 7.1 has an inside face 10 mounted in airtight manner against the outside face of the cylindrical central portion 7.1. As shown in FIG. 4, this annular portion is fitted with two measurement nozzles 21 that are diametrically opposite and that pass radially through the annular portion 7.2. These nozzles 21 are fed from an annular chamber 23 defined by a circumferential groove 25 formed in the periphery of the central portion 7.1 and by the inside face 10 of the annular portion 7.2. The annular chamber 23 is connected to the channel 13.3 via a radial hole 14.3 (FIG. 4).

In addition, two grooves 26 are formed in the outside of the annular portion 7.2 on either side of each of the measurement nozzles 21, parallel to the longitudinal axis of the ring.

Also, the annular portion 7.2 is fitted with four centering nozzles 27 disposed around the periphery of said annular portion, extending along radii that define equal angles of 90° between one another and that are disposed symmetrically about a diametral plane P that includes the channels 13.1 and 13.2. Each centering nozzle 27 is constituted by a series of orifices 28 aligned in a direction parallel to the axis of the ring and opening out both to the outside of the annular portion 7.2 and into a duct 30 that extends along an axial direction of the ring 7.

As can be seen better in FIG. 3, the ducts 30 of the centering nozzles 27 are connected in pairs to chambers 29.1 and 29.2 via radial holes 32. Each chamber is defined by a groove 31 formed both in the cylindrical central portion 7.1 over an annular fraction of its periphery and the inside face 10 of the annular portion 7.2. The chamber 29.1 communicates with the channel 13.1 via a radial hole 14.1, and the chamber 29.2 communicates with the channel 13.2 via a radial hole 14.2. The various radial holes are disposed symmetrically about the plane P so that headlosses are the same when feeding the centering nozzles.

In operation, the two pipes 20 associated with the channels 13.1 and 13.2 are connected to a source of gas under pressure while the pipe 20 which is associated with the channel 13.3 is connected to a measurement chamber (not shown) that includes a pressure take-off connected to a pressure gauge and that is fed with gas from a source of gas at a pressure that is stable.

When the measurement ring 7 is inserted inside a bore of a part to be inspected (not shown), the gas which escapes under pressure through the ends of the centering nozzles 27 forms a cushion of air between the wall of the bore and the outside face of the annular portion 7.2 of the measurement ring 7. Since the gas is delivered to the four centering nozzles 27 in symmetrical manner, the pressure of the air cushion is uniform. The cushion therefore centers the measurement ring 7 very accurately in the bore. Thus, both of the measurement nozzles 21 from which there escapes the gas under pressure from the measurement chamber, are situated at the same distance from the wall of the bore. The pressure measured by the pressure gauge in the measurement chamber therefore corresponds accurately to the diameter of the bore, and the same measurement is obtained each time the plug is inserted into the same bore. The accuracy of the measurement is thus greatly improved compared with prior devices. In addition, the automatic centering of the ring within the bore without contact with the wall thereof makes it possible to provide a measurement ring whose outside diameter is very close to the diameter of the bore to be measured, thereby further improving the measurement by reducing the distance between each measurement nozzle and the facing wall.

The invention is not limited to the embodiment described above, but on the contrary it extends to any device which uses equivalent means to reproduce the essential characteristics defined in the claims. For example, although a pneumatic measurement plug has been described which has only one measurement ring, it is naturally possible to provide an analogous pneumatic measurement plug which has a plurality of measurement rings distributed along the elongate member, each comprising a pair of measurement nozzles fed with gas under pressure from a measurement chamber specific to the ring in question. Similarly, although the above-described example has a measurement ring with only one pair of measurement nozzles, it is possible to fit the measurement plug with rings each having a plurality of pairs of measurement nozzles that are mutually angularly offset and that are fed with gas under pressure via ducts associated with independent measurement chambers, thereby making it possible to measure different diameters of the bore in a common transverse plane, and thus ensure that the bore is indeed circular in section.

Although the measurement plug of the invention is described above as having four centering nozzles, it is possible to provide only three centering nozzles. Under such circumstances, it is necessary to provide an appropriately adaptive feed so that the support face of each air cushion provided by the three nozzles is balanced in order to achieve effective centering.

I claim:

1. A pneumatic measurement plug comprising an elongate member and at least one measuring ring mounted with radial play on the elongate member and having at least one pair of diametrically opposite measurement nozzles fed with gas under pressure plus at least three centering members disposed on the periphery of the measurement ring on radii that define substantially equal angles between one another, wherein the center members are nozzles fed with gas under pressure independently from the measurement nozzles.

2. A pneumatic measurement plug according to claim 1, having four centering nozzles for each measuring ring, the centering nozzles being fed in pairs, with each pair being fed by a feed chamber that is symmetrical in configuration about a plane of symmetry of the centering nozzles.

3. A pneumatic measurement plug according to claim 2, wherein the elongate member is a cylinder, wherein the measurement ring has a cylindrical central portion through which the cylindrical elongate member passes, and an annular portion having an inside face mounted in airtight manner on the periphery of the cylindrical central portion, and wherein each feed chamber is defined both by a groove formed in the periphery of the cylindrical central portion and by the inside face of the annular portion.

4. A pneumatic measurement plug according to claim 1, wherein each centering nozzle has a plurality of orifices aligned in an axial direction of the measurement ring.

* * * * *